US012023945B2

(12) United States Patent
Schiestl

(10) Patent No.: US 12,023,945 B2
(45) Date of Patent: Jul. 2, 2024

(54) PRINTING SYSTEM AND METHOD FOR PRINTING PRINT MATERIAL

(71) Applicant: Angelo Schiestl, Langkampfen (AT)

(72) Inventor: Angelo Schiestl, Langkampfen (AT)

( * ) Notice: Subject to any disclaimer, the term of this patent is extended or adjusted under 35 U.S.C. 154(b) by 0 days.

(21) Appl. No.: 17/264,575

(22) PCT Filed: Aug. 1, 2018

(86) PCT No.: PCT/EP2018/070881
§ 371 (c)(1),
(2) Date: Jan. 29, 2021

(87) PCT Pub. No.: WO2020/025130
PCT Pub. Date: Feb. 6, 2020

(65) Prior Publication Data
US 2021/0331506 A1 Oct. 28, 2021

(51) Int. Cl.
*B41M 5/00* (2006.01)
*B41M 1/12* (2006.01)
*B41M 7/00* (2006.01)

(52) U.S. Cl.
CPC ............ *B41M 5/0011* (2013.01); *B41M 1/12* (2013.01); *B41M 7/00* (2013.01)

(58) Field of Classification Search
CPC . B65G 1/1375; B41M 5/0011; B41J 3/40731; B41J 11/22; B41J 13/10
See application file for complete search history.

(56) References Cited

U.S. PATENT DOCUMENTS

2008/0022516 A1* 1/2008 Frank ............... G05B 19/41815 700/19
2008/0269960 A1 10/2008 Kostmann
2018/0086566 A1* 3/2018 Hutter ..................... B41J 2/3355
2019/0160808 A1* 5/2019 Jeretzky .................. B41F 21/00
2019/0263146 A1* 8/2019 Sharp ...................... F16D 27/01
2020/0192337 A1* 6/2020 Hoffman .......... G05B 19/41805

FOREIGN PATENT DOCUMENTS

DE 202009016623 U1 4/2010
EP 2130680 A1 12/2009
EP 2509791 B1 10/2013
EP 3121015 A1 1/2017
(Continued)

OTHER PUBLICATIONS

Machine Translation of EP 2130680 A1 (Year: 2009).*
(Continued)

*Primary Examiner* — Jennifer Bahls
*Assistant Examiner* — Quang X Nguyen
(74) *Attorney, Agent, or Firm* — Studebaker & Brackett PC

(57) ABSTRACT

The invention relates to a printing system and a method for printing print material, with a number of printing stations, at least one pre- and/or post-treatment station and a number of print product carriers for taking up a print product and for transporting the print product to the stations. It is provided according to the invention that the print product carriers each have their own drive, a steerable chassis and a control unit for independent movement of the print product carriers and that the stations are arranged on a transport surface, on which the print product carriers are freely movable.

10 Claims, 1 Drawing Sheet

(56) References Cited

FOREIGN PATENT DOCUMENTS

| | | | |
|---|---|---|---|
| EP | 3121016 | A1 | 1/2017 |
| WO | 2009146767 | A1 | 12/2009 |

OTHER PUBLICATIONS

International Search Report issued in PCT/EP2018/070881; mailed May 7, 2019.
International Preliminary Report on Patentability issued in PCT/EP2018/070881; Date of completion of this report: Jul. 22, 2020.
An Office Action mailed by the Bangladesh Patent Office on Aug. 27, 2020, which corresponds to Bagladesh Patent Application No. 2019/000208 and is related to U.S. Appl. No. 17/264,575.
An Office Action mailed by China National Intellectual Property Administration on May 20, 2022, which corresponds to Chinese Patent Application No. 201880094782.6 and is related to U.S. Appl. No. 17/264,575; with English language translation.
An Office Action mailed by the Korean Intellectual Property Office on Jan. 12, 2023, which corresponds to Korean Patent Application No. 10-2020-7037928 and is related to U.S. Appl. No. 17/264,575; with English language translation.

* cited by examiner

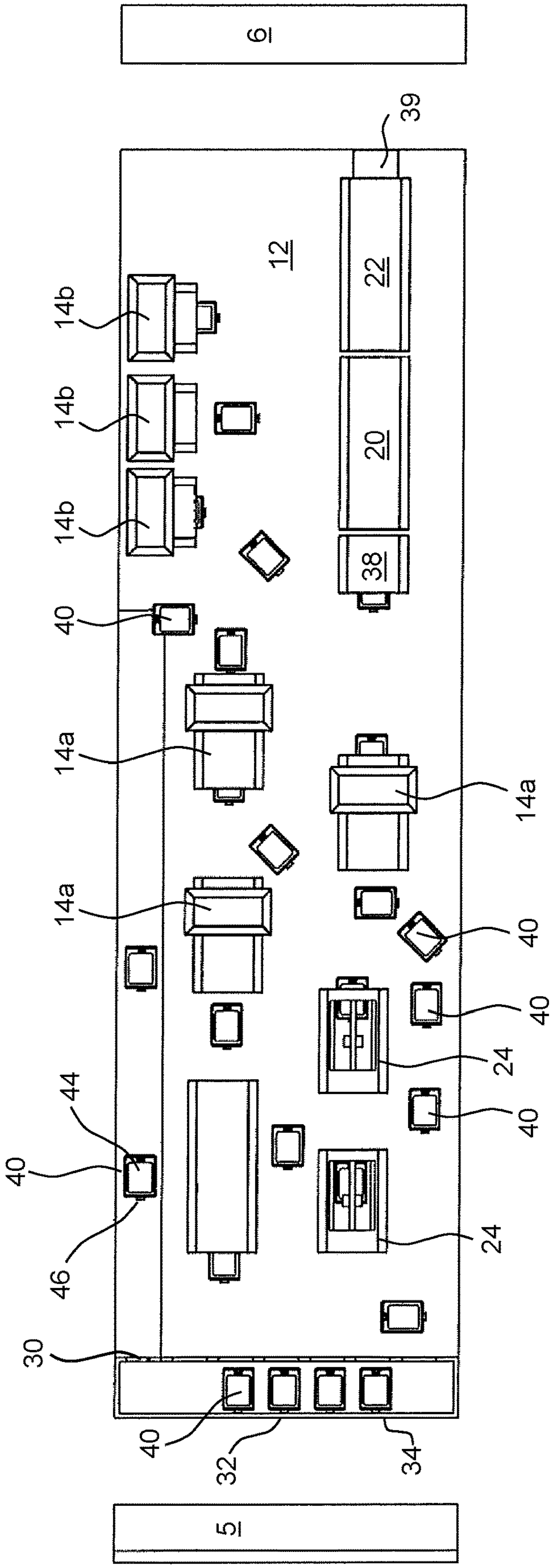
6
39
12
22
20
38
14b
14b
14b
40
10
14a
14a
14a
40
40
24
40
24
44
40
46
30
40
32
34
5

PRINTING SYSTEM AND METHOD FOR PRINTING PRINT MATERIAL

The invention relates to a printing system for printing print material, with a number of digital printing stations, at least one pre- and/or post-treatment station and a number of print product carriers for taking up a print product and for transporting the print product to the stations.

The invention further relates to a method for printing a print product, wherein a number of digital printing stations and at least one pre- and/or post-treatment station are provided for printing and the print products are each arranged on a print product carrier and transported thereby to the stations.

A printing system of the generic kind is disclosed by WO 2009/146767 A1, for example. On this known printing machine, a textile to be printed is placed as a print product on a print product carrier. The print product carrier with the stretched textile passes through a number of digital printing stations, which are placed in a line along a conveyor belt. Further processing stations, for pre- or post-treatment, for instance, can be arranged along the conveyor belt. Such a printing system operates efficiently if many print products are to be printed identically.

In individual printing of textiles, for example of T-shirts, it can be necessary that a first textile is to be printed only with one color, for example, while a subsequent textile is to be printed with several colors. It can also be the case that some textiles require a pre-treatment, for instance priming, but another textile does not. However, since all textiles pass through all stations, the time outlay for all textiles is almost uniformly high and the efficiency of such a printing system declines.

A printing machine is known from EP 2 509 791 B1 in which a plurality of printing stations is arranged along an oval-shaped circumferential rail along a base frame. Furthermore, a plurality of print product carriers is provided, which transport a workpiece to be printed to the individual printing stations along the circumferential rail. To increase the flexibility, it is provided with regard to this printing machine that each print product carrier is equipped with a drive, which is connected via a contact connection to an electrical energy source. Furthermore, each print product carrier has at least one drive wheel for driving the print product carrier, wherein the drive wheel engages frictionally or in a form-locking manner with a guide rail. In spite of the increased flexibility, a workpiece that is to be printed with a plurality of colors, for instance, determines the overall throughput through the printing machine when passing through.

EP 3 121 015 A1 discloses a printing device with a print table, on which two pallets are supported parallel to one another movably between a set-up station and a printing station.

The object of the invention is to specify a printing system and a method for printing print material with which even print material to be printed individually differently can be printed with high efficiency.

The object is achieved according to the invention by a printing system with the features of claim 1 and by a method with the features of claim 12. Preferred embodiments of the invention are specified in the dependent claims.

The printing system according to the invention is characterized in that the print product carriers each have their own drive, a steerable chassis and a control unit for independent movement of the print product carriers, and that the stations are arranged on a transport surface, on which the print product carriers are freely movable.

A basic idea of the invention consists in departing from a linear conveyor track for all print product carriers and forming these as freely movable print product carriers. For this purpose the print product carriers each have their own drive, a steerable chassis and a control unit for independent movement of the print product carriers.

According to another aspect of the invention, the individual stations are no longer arranged linearly or sequentially to one another but are positioned widely distributed on a transport surface, on which the print product carriers can be moved freely or in any way.

According to one aspect of the invention, the individual print product carriers can thus head freely and solely dependent on order data to suitable and freely available stations of the printing system. A first in-first out principle is nullified hereby and a departure is made from sequential processing of print tasks. A print product carrier with a print product that is to be printed with just one color, for example, can thus overtake a print product carrier activated earlier that has to pass through several printing stations. Print material can thus be printed time-efficiently, wherein the individual printing and processing stations can be used efficiently at the same time.

Another advantage of the invention consists in the fact that the entire printing system can be adapted relatively easily to changes in capacity, in particular by adding other required printing stations or processing stations.

A preferred embodiment of the invention consists in providing at least one loading station for loading the print product onto the print product carrier and/or at least one unloading station for removing the printed print product from the print product carrier. Operators for manual loading or unloading can be provided at these loading or unloading stations. The loading stations can also be provided partly automated or fully automated, wherein a loading robot, for instance, removes a print product, for example a T-shirt, from a store and supplies it to the print product carrier.

With respect to the print material, textiles are preferably provided, in particular articles of clothing, such as T-shirts, sweatshirts etc. However, the invention is not limited to the printing of textiles but can be used in particular also for printing leather, wood, stone, ceramic, metal parts, cardboard boxes, plastics or other individual piece goods.

Another preferred implementation variant of the invention can be seen in that the control unit of the print product carrier has a receiving device for receiving order data for a print order of the print product taken up. The receiving device can operate in this case contact-bound for data transmission to the loading station, for instance, or preferably contactlessly. The receiving unit can be a scanner in particular.

It is especially advantageous in this case that a transmission device is provided at the loading station for transmitting and/or displaying order data. On take-up of the print product, the movable print product carrier thus receives all necessary order data and thus the necessary information about which individual printing and processing stations are to be visited. The stations present can be stored in a suitable memory of the control unit of the print product carrier.

According to a further development of the invention, it is particularly expedient that a central computer unit is provided, which is connected to the stations. The operating status of all stations can thus be interrogated via a central computer unit and corresponding data also transmitted to the stations.

A particularly efficient operating mode results according to another embodiment of the invention in that the stations have data transmission devices, which transmit information on the utilization of the station to the central computer unit and/or the control unit of the print product carriers.

It is particularly expedient in this case that the central computer unit has a data connection to the movable print product carriers.

In this way the control units of the movable print product carriers receive all the required information that is necessary to process in an efficient manner an order that has been placed. On the basis of set conditions, the control unit or the central computer unit can decide autonomously which station and in which sequence individual stations are to be visited to fulfil a print order.

In principle the print product carriers can be provided with any suitable drive. In particular, even an inductive drive and/or at least an inductive energy supply can be effected by the transport surface. It is particularly advantageous according to a further development of the invention that the drive of the print product carrier is formed as an electric drive and that the print product carrier has a rechargeable battery. The battery can be preferably a lithium ion battery in this case, which is very powerful and constitutes a relatively inexpensive energy store.

It is particularly expedient here that at least one electric charging station is provided, which is formed to charge the battery of the print product carrier. The charging stations can be combined with processing stations or can be separate charging or servicing stations. In particular, a plurality of charging stations can be arranged on the transport surface. Here the control unit of each print product carrier or the central computer unit decides when and which charging station is to be visited by the movable print product carrier. This can be decided as a function of the residual capacity of the battery and of free capacities at charging stations.

Even if the printing system according to the invention is preferably provided with digital printing stations, other printing stations or miscellaneous processing stations can be provided in addition or also alternatively if applicable. It is particularly preferred in this case that at least one drying station and/or at least one pressing station and/or at least one flocking station and/or at least the screen printing station and/or at least another processing station are provided.

A drying station is used during or after printing for drying an applied substrate or an ink. A pressing station can be used for additional fixing of the applied medium and in particular of the ink. For certain prints with a fiber surface, a so-called flocking station can be provided for applying fibers or other design elements. For the rapid application of larger quantities of ink or other substances, at least one screen printing station can be arranged with a printing screen. A screen print is especially advantageous in this case for applying a primer in particular, for instance a white primer on a dark or black textile.

According to a further development of the invention, it is advantageous that the control unit can store the stations that have been visited for processing the order, and that an evaluation unit is provided, which for quality assurance purposes compares a print result of the print product to be printed with the stations used.

If deficiencies in the print result are detected during quality assurance, it can be determined, by means of the stored processing data with the stations used, which station may have to be serviced or switched off to avoid faulty printing. By appropriate automation of the quality assurance, for instance by a camera system with an image processing system, even initial aberrations on a print result can be determined so early that fault-free print operation can be achieved or at least aimed at by prompt servicing of individual stations.

The method according to the invention is characterized in that the print product carriers each have their own drive, a steerable chassis and a control unit and the print product carriers are moved independently of one another and that the stations are arranged on a transport surface on which the print product carriers are moved freely to individual stations.

The method according to the invention can be carried out in particular with the previously described printing system according to the invention. The advantages described previously can be achieved in this case.

The invention is explained further by means of a preferred exemplary embodiment, which is depicted schematically in the drawing.

In the single drawing, a printing system 10 according to the invention is depicted schematically in a plan view on a greatly reduced scale.

The printing system 10 has a transport surface 12, which can be a factory floor in particular. Arranged on the transport floor 12 is a plurality of movable print product carriers 40, which each have a box-like, steerable chassis 42 and an upper take-up surface for a print product to be printed, in particular a T-shirt. The take-up surface can have a fixed or detachable pallet. A steerable chassis 42 is to be understood both as a mechanical steering mechanism with a steering axle and as a single-wheel control with a rigid axle or another suitable steering device. The movable print product carriers 40 have an electric drive, which is not shown in greater detail and is supplied with energy by a rechargeable battery. Furthermore, the print product carriers 40, which can also be described as a bot, have a receiving or reading device for receiving order data.

The order data can be received at a loading station 30, which is provided with a suitable transmission device 32, when the print product is placed automatically or by an operator with or without pallet onto the take-up surface on the print product carrier 40. The textile can be removed here from a store 5 provided directly at the loading station 30. In the exemplary embodiment depicted, the loading station 30 for loading a plurality of print product carriers 40 is formed at the same time as a charging station 34, in order to charge the battery of the print product carrier 40 with electrical energy. However, other charging stations 34 can be provided separately from the loading station 30 on the transport surface 12.

Furthermore, a monitoring device, in particular a camera system, can be provided at the loading station 30, with which a correct, in particular fold-free placement of the print product on the print product carrier 40 can be checked. If a fault is detected during loading, the print product carrier 40 returns directly to the loading station 30 again for fault rectification.

According to the order data transmitted in the loading station 30, a control unit of the print product carrier 40 decides, if applicable under the influence of a central computer unit, which stations on the transport surface 12 are to be visited.

The print product carrier 40 can thus call initially at a pre-treatment station 16, in which the print product is first pre-treated in a known manner for the subsequent printing. The print product carrier 40 can then call with the print product at one or more digital printing stations 14, in which one or more colors are applied to the print product by means of digital inkjet print heads. Here the digital printing stations 14 can be formed as throughput printing stations 14*a*, in which the print product carrier 40 passes linearly through the printing station. Alternatively or in addition, the print product carrier 40 can also head with the print product for a local printer 14*b*, at which the print product carrier 40 with the print product is stationary at a printing position during the printing process. Following digital printing the print product carrier 40 leaves the printing position at the local printer 14*b* again.

Depending on the print order, the print product carrier 40 can also call in the exemplary embodiment depicted at one or more screen printing stations 24, in which a white background, pre-treatment, special effects such as glitter, films, adhesive, HD etc., for example, can be applied. The screen printing stations 24 can be provided in this case with automatic screen changing devices.

Further stations such as a dryer can also be provided for post-treatment.

In the exemplary embodiment of the printing system 10 depicted, the print product carrier 40 calls following the last print and processing step at an unloading station 38, wherein a drying station 20 is connected downstream of the unloading station 38. In the unloading station 38, the printed print product can be removed alone or with a detachable pallet from the print product carrier 40 and moved via a conveying device 39 through a concluding drying station 20 and a packing station 22. The finished and packed print product can then be brought by the conveying device 39 to a dispatch station 6.

At the unloading station 38 an appropriate device, in particular a camera system, can likewise be provided for quality inspection. If quality defects are detected, the defective goods can be removed or the print product carrier 40 with the print product can be returned to one of the upstream stations, in particular even to the loading station 30, for post-processing.

Following removal of the finished print product from the print product carrier 40, the print product carrier 40 can return to the loading station 30 again for another processing operation.

The invention claimed is:

1. A printing system for printing print material with
 a plurality of digital printing stations, each of which is for applying ink to a print product,
 at least one pre- and/or post-treatment station,
 a number of print product carriers for taking up the print product and for transporting the print product to the stations, and
 a central computer unit having a data connection to the stations for receiving data on availability of each of the stations, and having a data connection to the movable print product carriers for transmitting data to the print product carriers on the availability of each of the stations,
 wherein
 the print product carriers each have their own drive, a steerable chassis and a control unit for independent movement of the print product carriers on a factory floor as a transport surface,
 the stations are arranged spaced from each other in a non-linear manner on the transport surface, on which the print product carriers are freely movable,
 each of the print product carriers are for transporting the print product to each of the digital printing stations in a non-sequential manner, and
 the control unit of each print product carrier autonomously determines which of the stations to be visited and a sequence of the stations to be visited by their respective print product carrier, based on order data for a print order of the print product taken up, and the availability data of each of the stations.

2. The printing system according to claim 1, wherein
 at least one loading station for loading the print product onto the print product carrier and/or at least one unloading station for removing the printed print product from the print product carrier is provided.

3. The printing system according to claim 2, wherein
 a transmission device is provided at the loading station for transmitting the order data to the control unit of the print product carrier.

4. The printing system according to claim 1, wherein
 the control unit of the print product carrier has a receiving device for receiving the order data.

5. The printing system according to claim 1, wherein
 the stations have data transmission devices, which transmit information data on utilization of the station to the central computer unit and/or the control unit of the print product carriers.

6. The printing system according to claim 1, wherein
 the drive of the print product carrier is formed as an electric drive and that the print product carrier has a rechargeable battery.

7. The printing system according to claim 6, wherein
 at least one electric charging station is provided, which is formed to charge the battery of the print product carrier.

8. The printing system according to claim 1, wherein
 at least one drying station and/or at least one pressing station and/or at least one flocking station and/or at least one screen printing station and/or at least a further processing station are provided.

9. The printing system according to claim 1, wherein
 the stations that have been visited for processing the order can be stored by the control unit, and that an evaluation unit is provided, which for quality assurance purposes compares a print result of the printed print product with the stations used.

10. A method for printing a print product, in particular with a printing system according to claim 1, the method comprising:
 transporting the print product to one of the pre-treatment stations using one of the print product carriers; and
 transporting the print product from the pre-treatment station to a plurality of the digital printing stations using the one of the print product carriers, in an order based on the availability of each of the plurality of digital printing stations.

* * * * *